Feb. 20, 1951  W. B. STREETY ET AL  2,542,591
AUTOMATIC CUTOFF VALVE FOR TANKS
Filed Aug. 9, 1946
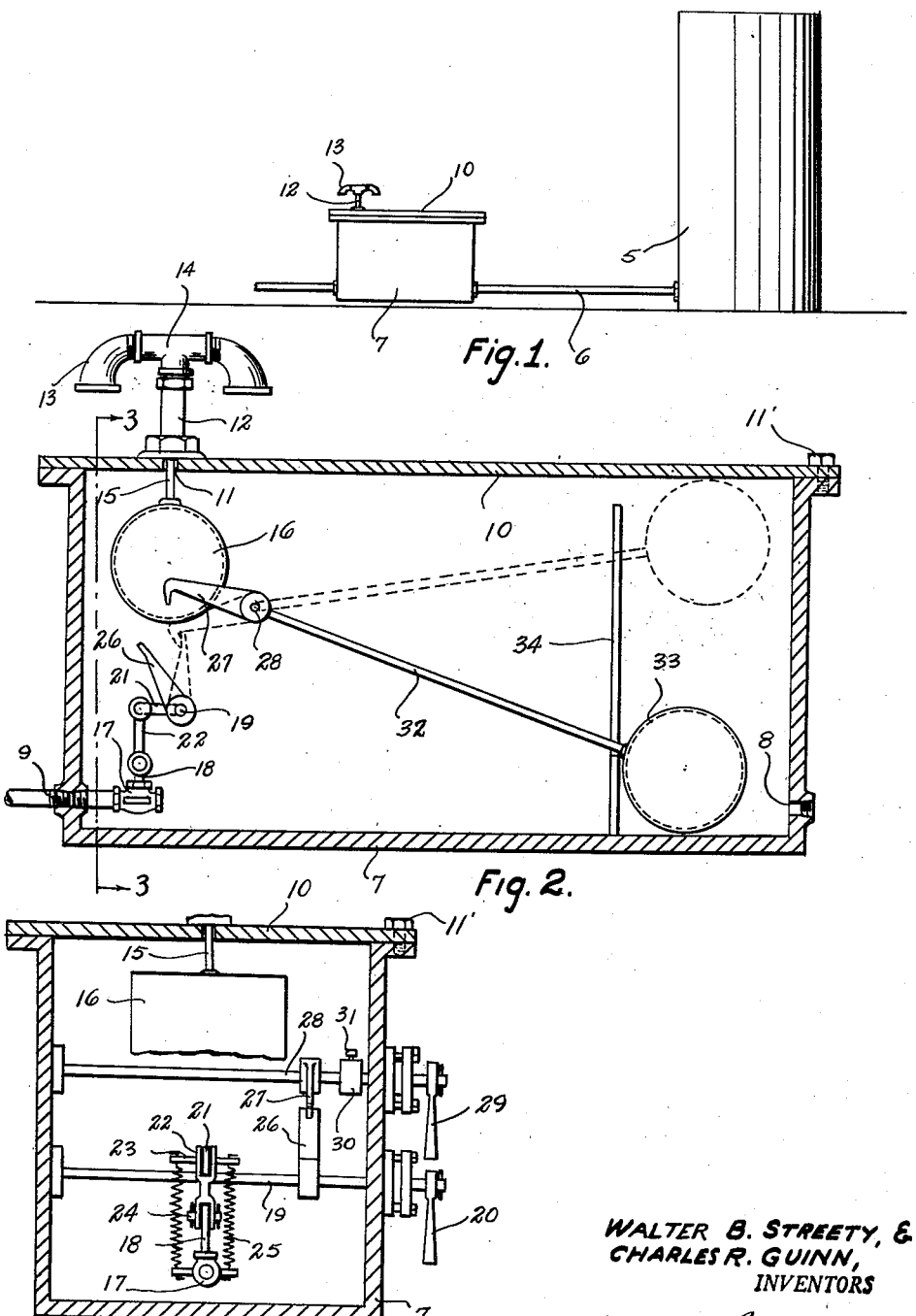
WALTER B. STREETY, &
CHARLES R. GUINN,
INVENTORS
BY
ATTORNEYS.

Patented Feb. 20, 1951

2,542,591

UNITED STATES PATENT OFFICE 2,542,591

AUTOMATIC CUTOFF VALVE FOR TANKS

Walter B. Streety and Charles R. Guinn, Konawa, Okla.

Application August 9, 1946, Serial No. 689,494

2 Claims. (Cl. 137—68)

The present invention relates to new and useful improvements in automatic cut-off valves for tanks, and more particularly to a device of this character interposed in a pipe line leading from a tank and adapted to automatically close the pipe line when the tank has been emptied to prevent the air from entering the line.

The invention is designed primarily for use for automatically closing the pipe line from oil storage tanks which are periodically drained and important object of the invention is to automatically close the pipe line to prevent sucking of air into the line on the draining of the tank.

A further object of the invention is to provide an automatic cut-off of this character including a spring actuated valve for closing the line together with manually operated means to set the valve in its open position and a float-controlled trip mechanism to release the valve for the automatic closing thereof and under control of the liquid passing through the line.

A still further object of the invention is to provide a float tank in the pipe line leading from the storage tank and in which the float-controlled valve for the pipe line is mounted together with a vent in the float tank also having a float-controlled valve to exhaust the air from the float tank when the latter is again supplied with liquid from a storage tank.

An additional object is to provide an apparatus of this character of simple and practical construction, which is efficient and reliable in operation, relatively inexpensive to manufacture and install in operative position in a pipe line and which otherwise is well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view showing the float tank in position in a pipe line;

Figure 2 is an enlarged longitudinal sectional view of the float tank; and

Figure 3 is a transverse sectional view taken on a line 3—3 of Figure 2.

Referring now to the drawing in detail, wherein for the purpose of illustration we have disclosed a preferred embodiment of the invention, the numeral 5 designates a storage tank of conventional construction to the lower portion of which a pipe line 6 is connected. A float tank 7 is interposed in the pipe line and provided with inlet and outlet ports 8 and 9 in its opposite sides. The top of the tank 7 is closed by a cover 10 secured thereto by bolts or the like 11'.

The top 10 is formed with a vent opening 11 to which a vertical vent pipe 12 is attached and having downturned extensions 13 connected thereto by means of a T-fitting 14. A conventional form of valve (not shown) is mounted in position between the vent pipe 12 and fitting 14, the valve being operated by a stem 15 working through the opening 11 and having a float 16 connected to its lower end. The vent valve is closed by an upward movement of the float 16 by liquid contained in the tank 7 and is open when the liquid drops below a predetermined level.

A conventional form of valve 17 is connected to the outlet port 9 inside the tank 7 and includes a valve stem 18 rising from the valve body 17 and arranged to close the valve 17 by a downward movement of the stem 18.

A shaft 19 is journalled in the side of the tank 7 with one end of the shaft projecting outwardly therefrom and provided with a handle 20. An apertured lug 21 projects radially from the shaft 19 and to which a double-ended yoke 22 is connected by means of a pin 23. The other end of the yoke 22 is connected to the upper end of the stem 18 by means of a pin 24. A pair of coiled springs 25 have their upper ends connected to the ends of the upper pin 23 and are connected at their lower ends to the valve body 17 whereby to exert a downward movement on the valve stem 18 to close the valve.

A trip arm 26 is secured to the shaft 19 and extends upwardly therefrom for engagement by a hook-shaped catch 27 which is secured to a second shaft 28 journalled in the sides of the tank 7 above the shaft 19. One end of the shaft 28 also projects outwardly from the side of the tank and is likewise provided with a handle 29.

A collar 30 is secured to the shaft 28 by means of a set screw 31 and to which is attached a float arm 32 having a float 33 connected at its outer end. The float arm 32 is arranged for vertical movement in an upstanding guide 34 in the tank 7.

In the operation of the device, the valve 17 is opened by turning the handle 20 in a direction to raise the valve stem 18 and which also raises the trip arm 26 into a position for engagement by the hook 27 which is moved into engaging position by the handle 29. Liquid from the tank 5 enters float tank 7 by way of the inlet 8 and flows through the tank 7 and out through the port 9. Any air trapped in the tank 7 is vented through the opening 11 and pipes 12 and 13. When liquid in the tank raises the float 16 the vent valve is closed.

Upon draining of the tanks 5 and 7 the float 33 will drop thereby releasing trip arm 26 and springs 25, then close the valve 18 to prevent air entering the pipe line beyond the float tank 7.

It is believed that the details of construction, manner of use and advantages of the device will be readily understood from the foregoing without further detailed explanation.

It is to be understood, however, that even though we have herein shown and described a preferred embodiment of our invention, the same is susceptible of certain changes fully comprehended by the spirit of the invention as herein described, and the scope of the appended claims.

We claim:

1. In an automatic cutoff device, a tank having an inlet and an outlet near its bottom, a valve for the outlet including a valve casing separate from the tank and a vertical rectilinear reciprocatory stem, the valve casing being arranged within the tank, a lower rock shaft mounted within the tank above the valve and extending to the exterior of the tank, a manually operated element connected with the outer end of the rock shaft, a radially extending crank rigidly mounted upon the rock shaft within the tank, a link pivotally connected with the crank and stem, an upstanding arm rigidly mounted upon the lower rock shaft within the tank, a spring connected with the valve and crank to swing the latter downwardly, an upper horizontal rock shaft within the tank and extending to the exterior of the tank, a manually operated element secured to the outer end of the upper rock shaft, an upper radial crank rigidly mounted upon the upper rock shaft and having a downturned hook to engage with the upstanding arm, a float within the tank, and a rod connecting the float and upper rock shaft.

2. In an automatic cutoff device, a tank having an inlet and an outlet near its bottom, a valve for the outlet including a valve casing separate from the tank and a vertical rectilinear reciprocatory stem, the valve casing being arranged within the tank, a lower rock shaft mounted within the tank above the valve and extending to the exterior of the tank, an operating element connected with the outer end of the rock shaft, a radially extending crank rigidly mounted upon the rock shaft within the tank, a link pivotally connected with the stem, an upstanding arm rigidly mounted on the lower rock shaft within the tank, a pin pivotally connecting the crank and link and projecting upon opposite sides of the crank, retractile coil springs arranged upon opposite sides of the crank and connected with the pin to swing the crank downwardly, an upper horizontal rock shaft within the tank and extending to the exterior of the tank, a manually operated element secured to the outer end of the rock shaft, an upper radial crank rigidly mounted upon the upper rock shaft and having a downturned hook to engage with the arm, a float within the tank, and a rod connecting the float and the upper rock shaft.

W. B. STREETY.
CHARLES R. GUINN.

REFERENCES CITED

The following references are of record in the file of this patent:

UNITED STATES PATENTS

| Number | Name | Date |
|---|---|---|
| 204,630 | Starkey | June 4, 1878 |
| 400,920 | Krouse | Apr. 9, 1889 |
| 882,956 | Norris | Mar. 24, 1908 |
| 2,216,000 | Crawford | Sept. 24, 1940 |
| 2,266,930 | Watson | Dec. 23, 1941 |
| 2,292,509 | Carson | Aug. 11, 1942 |